(12) United States Patent
Wang et al.

(10) Patent No.: US 9,039,303 B2
(45) Date of Patent: May 26, 2015

(54) COMPACT MULTI-CHANNEL OPTICAL TRANSCEIVER MODULE

(71) Applicant: Applied Optoelectronics, Inc., Sugar Land, TX (US)

(72) Inventors: Yi Wang, Katy, TX (US); I-Lung Ho, Sugar Land, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 193 days.

(21) Appl. No.: 13/893,802

(22) Filed: May 14, 2013

(65) Prior Publication Data

US 2014/0341580 A1   Nov. 20, 2014

(51) Int. Cl.
*G02B 6/00* (2006.01)
*G02B 6/36* (2006.01)
*H04B 10/40* (2013.01)

(52) U.S. Cl.
CPC ...................................... *H04B 10/40* (2013.01)

(58) Field of Classification Search
USPC ................................... 385/88, 89, 91, 92, 94
See application file for complete search history.

(56) References Cited

U.S. PATENT DOCUMENTS

| | | |
|---|---|---|
| 6,493,121 B1 | 12/2002 | Althaus |
| 6,796,715 B2 | 9/2004 | Chiu et al. |
| 7,646,948 B2 * | 1/2010 | Ohtsu et al. ...................... 385/31 |
| 2005/0018177 A1 | 1/2005 | Rosenberg et al. |
| 2006/0088255 A1 | 4/2006 | Wu et al. |
| 2006/0171642 A1 | 8/2006 | Tamanuki et al. |
| 2007/0237449 A1 * | 10/2007 | Aoki et al. ....................... 385/14 |
| 2008/0069570 A1 | 3/2008 | Dallesasse |
| 2009/0202256 A1 | 8/2009 | Chen |
| 2009/0220248 A1 | 9/2009 | Hudgins |
| 2009/0317086 A1 * | 12/2009 | Morohashi et al. ........... 398/135 |
| 2011/0058771 A1 | 3/2011 | Lee et al. |
| 2012/0051685 A1 * | 3/2012 | Su et al. .......................... 385/14 |
| 2012/0189323 A1 | 7/2012 | Xu et al. |
| 2013/0089337 A1 * | 4/2013 | Kim et al. ...................... 398/139 |

OTHER PUBLICATIONS

PCT International Search Report mailed Oct. 3, 2014, received in corresponding PCT Application No. PCT/US14/37801, 14 pgs.

* cited by examiner

*Primary Examiner* — Akm Enayet Ullah
(74) *Attorney, Agent, or Firm* — Grossman Tucker Perreault & Pfleger, PLLC; Norman S. Kinsella

(57) ABSTRACT

A compact multi-channel optical may include a multi-channel transmitter optical subassembly (TOSA), a multi-channel receiver optical subassembly (ROSA) and a circuit board configured and arranged to fit within a relatively small space. The multi-channel ROSA is spaced from the circuit board to allow circuit components to be mounted between the circuit board and the ROSA. The multi-channel ROSA may also be inverted and mounted proximate a transceiver top housing portion, for example, using an L-shaped ROSA support, to transfer heat from the ROSA to the transceiver housing portion. The optical transceiver may be used in a wavelength division multiplexed (WDM) optical system, for example, in an optical line terminal (OLT) in a WDM passive optical network (PON).

24 Claims, 4 Drawing Sheets

COMPACT MULTI-CHANNEL OPTICAL TRANSCEIVER MODULE

TECHNICAL FIELD

The present disclosure relates to optical transceivers and more particularly, to a compact multi-channel optical transceiver module including a multi-channel transmitter optical subassembly (TOSA), a multi-channel receiver optical subassembly (ROSA), and circuit components.

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA), a multi-channel receiver optical subassembly (ROSA), and associated circuitry. The OLT module may also include other components such as a thermoelectric cooler (TEC), TEC controller, microcontroller, and heaters for wavelength control. One challenge with such OLT transceiver modules is accommodating the multi-channel TOSA, ROSA and circuitry in the relatively small space available in an OLT module while allowing the desired temperature control and thermal management. In a multi-channel transceiver, for example, the multiple lasers and photodiodes are electrically connected to circuit components, such as integrated circuits, which require space within the transceiver housing. The multiple lasers and photodiodes also generate heat, which may adversely affect operation of the transceiver if the heat is not properly dispersed.

BRIEF DESCRIPTION OF THE DRAWINGS

These and other features and advantages will be better understood by reading the following detailed description, taken together with the drawings wherein.

DETAILED DESCRIPTION

A compact multi-channel optical transceiver, consistent with embodiments described herein, may include a multi-channel transmitter optical subassembly (TOSA), a multi-channel receiver optical subassembly (ROSA) and a circuit board configured and arranged to fit within a relatively small space. The multi-channel ROSA is spaced from the circuit board to allow circuit components to be mounted between the circuit board and the ROSA. The multi-channel ROSA may also be inverted and mounted proximate a transceiver top housing portion, for example, using an L-shaped ROSA support, to transfer heat from the ROSA to the transceiver housing portion. The optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. As used herein, "tuning to a channel wavelength" refers to adjusting a laser output such that the emitted laser light includes the channel wavelength. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1:
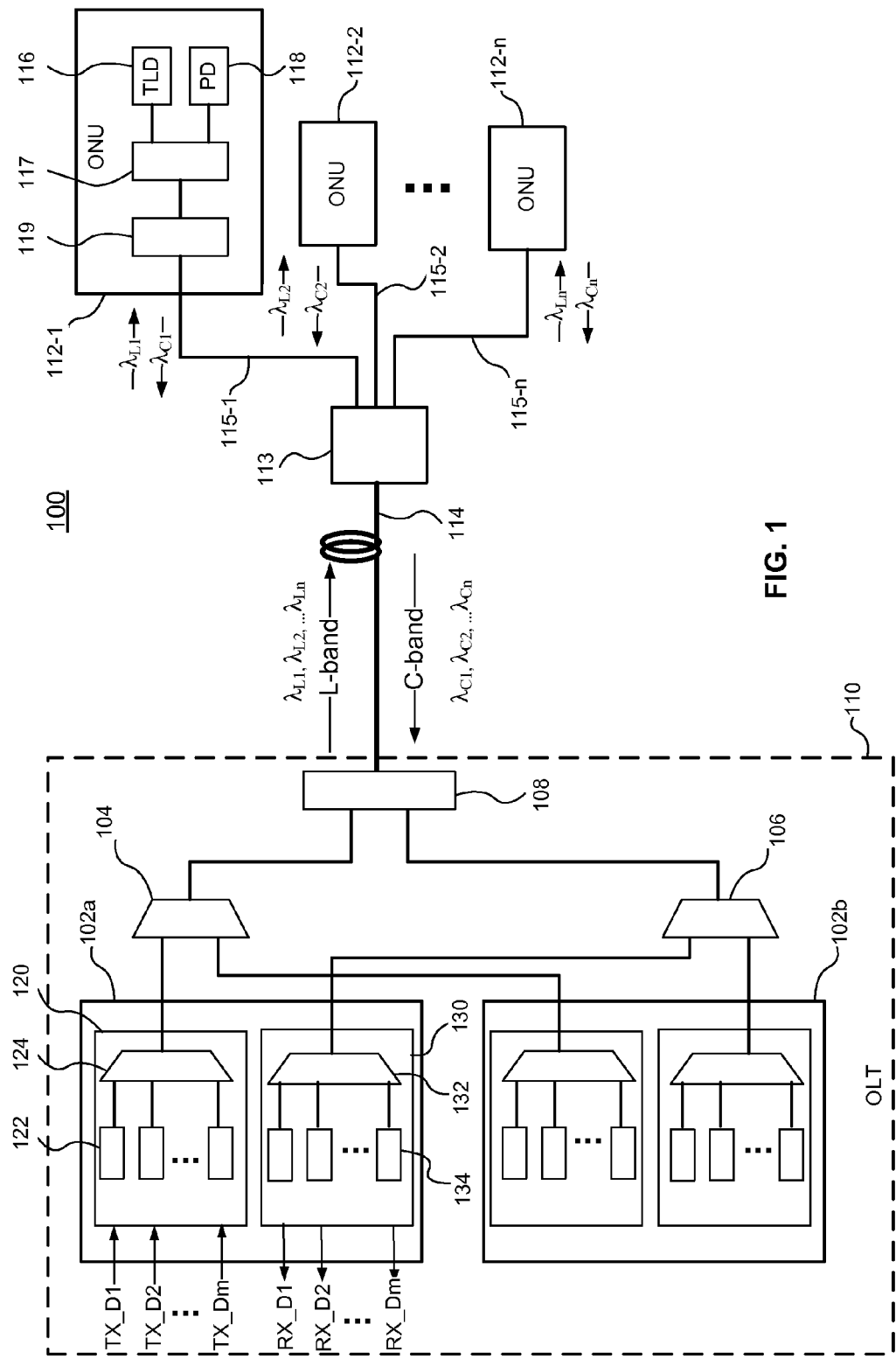
FIG. 1 is a functional block diagram of a wavelength division multiplexed (WDM) passive optical network (PON) including at least one compact multi-channel optical transceiver, consistent with embodiments of the present disclosure.

Referring to FIG. 1, a WDM-PON 100 including one or more multi-channel optical transceivers 102a, 102b, consistent with embodiments of the present disclosure, is shown and described. The WDM-PON 100 provides a point-to-multipoint optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g., $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ... $\lambda_{Cn}$). Other wavelengths and wavelength bands are also within the scope of the system and method described herein.

The branching point 113 may demultiplex a downstream WDM optical signal (e.g., $\lambda_{L1}$, $\lambda_{L2}$, ... $\lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}$, $\lambda_{C2}$, ... $\lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). The laser 116 may include a tunable laser configured to be tuned to the assigned channel wavelength. This embodiment of the ONU 112-1 may also include a diplexer 117 coupled to the laser 116 and the photodetector 118 and a C+L band filter 119 coupled to the diplexer 117, which allow the L-band channel wavelength ($\lambda_{L1}$) to be received by the ONU 112-1 and the C-band channel wavelength ($\lambda_{C1}$) to be transmitted by the ONU 112-1.

The OLT 110 may be configured to generate multiple optical signals at different channel wavelengths (e.g., $\lambda_{L1}$, $\lambda_{L2}$, ... $\lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g., $\lambda_{C1}$, $\lambda_{C2}$, ... $\lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths. As will be described in greater detail below, the multi-channel TOSA 120 and ROSA 130 are configured and arranged to fit within a relatively small transceiver housing and to facilitate heat transfer within the transceiver housing.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}$, $\lambda_{L2}$, ... $\lambda_{Lm}$). The TOSA 120 may also include a temperature control system for controlling temperature of the lasers 122 and the multiplexer 124 to maintain a desired wavelength precision or accuracy.

In some embodiments, the lasers 122 may be tunable lasers that generate the optical signals at the respective channel wavelengths. In other embodiments, the lasers 122 may generate optical signals over a band of channel wavelengths and filtering and/or multiplexing techniques may be used to produce the assigned channel wavelengths. Examples of optical transmitters including a laser array and AWG are disclosed in greater detail in U.S. patent application Ser. No. 13/543,310 (U.S. Patent Application Pub. No. 2013/0016971), U.S. patent application Ser. No. 13/357,130 (U.S. Patent Application Pub. No. 2013/0016977), and U.S. patent application Ser. No. 13/595,505 (U.S. Patent Application Pub. No.) 2013/0223844), all of which are fully incorporated herein by reference. In the illustrated embodiment, the OLT 110 further includes a multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

One embodiment of the multi-channel ROSA 130 includes a demultiplexer 132 for separating the respective upstream channel wavelengths (e.g., $\lambda_{C1}$, $\lambda_{C2}$, ... $\lambda_{Cn}$). An array of photodetectors 134, such as photodiodes, detects the optical signals at the respective separated upstream channel wavelengths and provides the received data signals (RX_D1 to RX_Dm). In the illustrated embodiment, the OLT 110 further includes a demultiplexer 106 for demultiplexing the upstream WDM optical signal into first and second WDM optical signals provided to the respective multi-channel ROSA in each of the transceivers 102a, 102b. The OLT 110 also includes a diplexer 108 between the trunk path 114 and the multiplexer 104 and the demultiplexer 106 such that the trunk path 114 carries both the upstream and the downstream channel wavelengths. The transceivers 102a, 102b may also include other components, such as laser drivers, transimpedance amplifiers (TIAs), and control interfaces, used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. In one example, the downstream L-band link between the OLT transceivers 102a, 102b and the ONUs 112-1 to 112-n may support a power budget of at least about 26 dB and the upstream C-band link between the ONUs 112-1 to 112-n and the OLT transceivers 102a, 102b may support a power budget of at least about 23 dB. One example of the WDM-PON 100 may operate at 1.25 Gbaud using 8B/10B encoded on-off keying as the modulation scheme. Other data rates and modulation schemes may also be used.

As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. To facilitate use of the multiplexer 104 and the demultiplexer 106, the range of channel wavelengths may skip channels (e.g., 2 channels) in the middle of the range. According to one example of a multi-channel optical transceiver used in the WDM-PON 100, the desired wavelength precision or accuracy is ±0.05 nm, the desired operating temperature is between −5 and 70 ° C., and the desired power dissipation is about 16.0 W.

Figure 2:
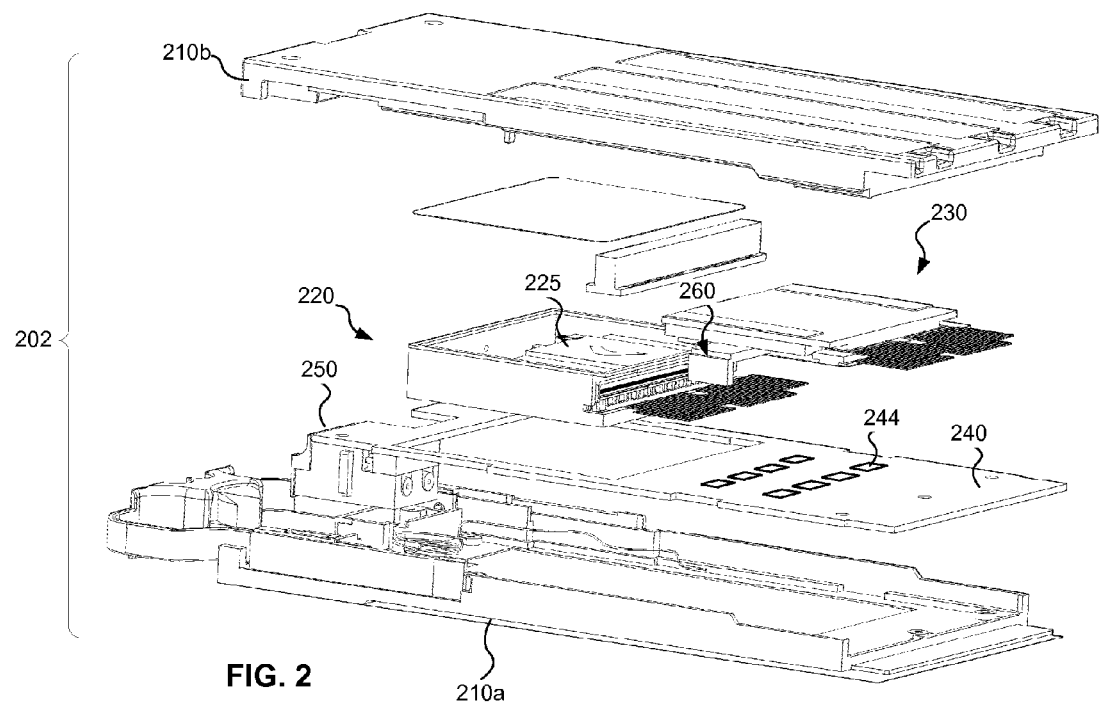
FIG. 2 is an exploded view of a compact multi-channel optical transceiver including a multi-channel TOSA, ROSA and circuit board, consistent with an embodiment of the present disclosure.
Figure 3:
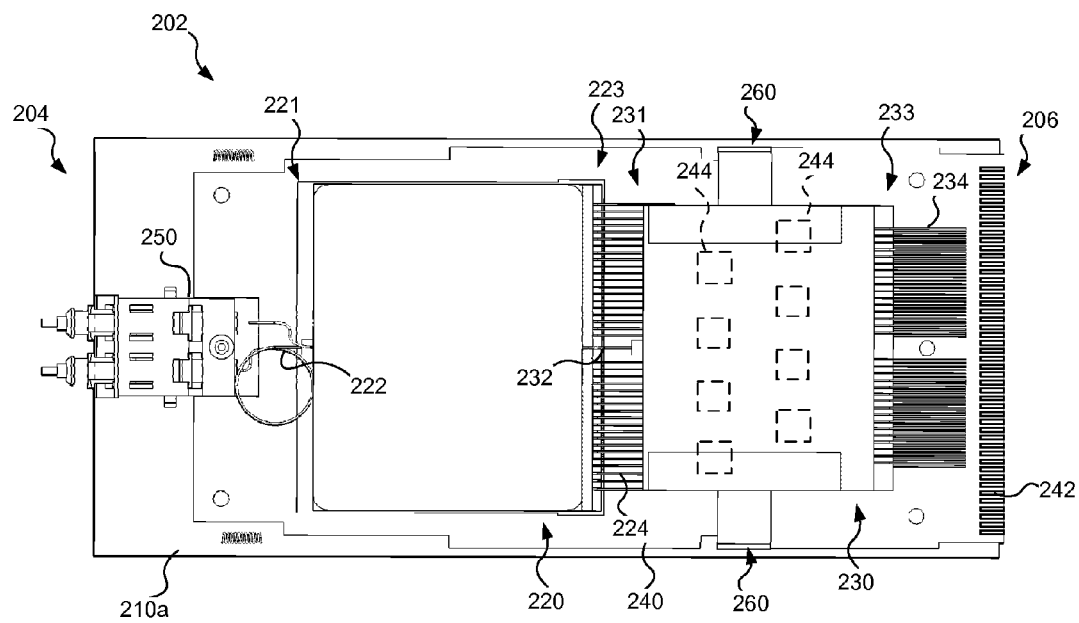
FIG. 3 is a top view inside the compact multi-channel optical transceiver shown in FIG. 2.

Referring to FIGS. 2 and 3, one embodiment of a compact multi-channel optical transceiver module 202 is shown and described in greater detail. As discussed above, multiple multi-channel transceiver modules may be used in an OLT of a WDM-PON to cover a desired channel range. The transceiver module 202 may thus be designed to have a relatively small form factor with minimal space. The compact optical transceiver module 202 generally provides an optical input and output at an optical connection end 204 and electrical input and output at an electrical connection end 206. The transceiver module 202 includes a transceiver housing 210a, 210b enclosing a multi-channel TOSA 220, a multi-channel ROSA 230, a circuit board 240, and a dual fiber adapter 250 directly linked to the TOSA 220 and the ROSA 230 for providing the optical input and output. The transceiver housing 210a, 210b may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm.

In the example embodiment, the TOSA 220 is located in the transceiver housing 210a, 210b proximate the optical connection end 204 and the ROSA 230 is located in the transceiver housing 210a, 210b proximate the electrical connection end 206. The circuit board 240 is located proximate the transceiver housing bottom portion 210a and extends to the electrical connection end 206. The ROSA 230 is located between the circuit board 240 and the transceiver housing top portion 210b. As will be described in greater detail below, the ROSA 230 may be spaced from the circuit board 240 to provide space for circuit board components and may be inverted and positioned proximate the transceiver housing top portion 210b to facilitate heat transfer from the ROSA 230 to the housing top portion 210b.

The TOSA 220 and the ROSA 230 each have an optical connection end 221, 231 directed toward the transceiver optical connection end 204 and an electrical connection end 223, 233 directed toward the transceiver electrical connection end 206. The optical connection ends 221, 231 of the TOSA 220 and the ROSA 230 are optically coupled to the dual fiber adapter 250 with respective optical fibers 222, 232, respectively, to provide a direct link between the adapter 250 and both the TOSA 220 and the ROSA 230. The electrical connection ends 223, 233 of the TOSA 220 and the ROSA 230 are electrically connected to the circuit board 240 using TOSA pins 224 and ROSA pins 234, respectively, soldered to conductive pads on the circuit board 240. The circuit board 240 includes input/output conductive pads 242 proximate the transceiver electrical connection end 206. Input conductive pads 242 may be provided on one side of the circuit board 240 for providing RF input to the TOSA 220 and output conductive pads 242 may be provided on the other side of the circuit board 240 for providing output from the ROSA 230.

The dual fiber adapter 250 is also configured to receive pluggable optical connectors, such as LC connectors (not shown), to connect the TOSA 220 and ROSA 230, respectively, to fiber optic cables (not shown). When the pluggable optical connectors are plugged into the dual fiber adapter 250, the adapter 250 establishes an optical coupling between the TOSA 220 and the ROSA 230 and the respective optical fibers in the fiber-optic cables, which carry the optical signals to and from the transceiver.

The multi-channel TOSA 220 includes an array of lasers (not shown in FIGS. 2 and 3) coupled to a multiplexer 225 such as an AWG. A temperature control system may be used to control the temperature of the individual lasers to provide a desired wavelength with a desired wavelength precision or accuracy. In one example, the temperature of each laser is maintained within ±0.5° C. in the operating range between −5 and 70 ° C. to maintain a wavelength precision or accuracy of about ±0.05 nm. The temperature control system may include a thermoelectric cooler (TEC), and the multiplexer 225 and/or the lasers may be mounted on the TEC in a bottom region of the TOSA 220. Examples of the TOSA are described in greater detail in U.S. patent application Ser. No. 13/708,064 (U.S. Patent Application Pub. No. 2014/0161455) and U.S. patent application Ser. No. 13/708,569 (U.S. Patent Application Pub. No. 2014/0161457), which are fully incorporated herein by reference.

Although the illustrated embodiment shows the TOSA 220 with the bottom region facing the transceiver housing bottom portion 210a, the TOSA 220 may also be inverted and the bottom of the TOSA 220 may be thermally coupled to (e.g., touching) the transceiver housing top portion 210b. The transceiver module 202 may be mounted in a cage assembly with the transceiver housing top portion 210b being located proximate a heat sink at the top of the cage. Because the TOSA 220 generates most of the heat from the bottom portion (e.g., from the TEC), the upside down or inverted configuration may provide better thermal dissipation and improve the overall working temperature range of the transceiver module 202.

The multi-channel ROSA 230 includes a demultiplexer, such as an AWG, coupled to an array of photodetectors, such as photodiodes, as will be described in greater detail below. The printed circuit board 240 may include circuitry and electronic components such as laser diode drivers, transimpedance amplifiers (TIAs), control interfaces, and temperature control circuitry. In the example embodiment, the circuit board 240 includes integrated circuit (IC) components 244 electrically connected to the TOSA 220 and the ROSA 230, for example, using conductive traces on or in the circuit board 240. The IC components 244 are mounted on at least one side of the circuit board 240 between the circuit board 240 and the ROSA 230 and may also be mounted on the opposite side of the circuit board 240. The IC components 244 may be arranged on the circuit board 240 in one or more rows of IC components 244.

In one embodiment, the IC components are combination IC components including a laser diode driver and a photodiode limiting amplifier. Each laser diode driver is electrically connected to a respective laser diode on the TOSA 220 and each photodiode limiting amplifier is electrically connected to a respective photodiode on the ROSA 230. In the example embodiment of a sixteen (16) channel transceiver, for example, the circuit board 240 may include 16 combination IC components 244. The 16 combination IC components may be arranged in two rows of four IC components 244 on each side of the circuit board 240.

In the example embodiment, ROSA supports 260 hold and support the ROSA 230 on each side of the ROSA 230. The ROSA supports 260 are mounted to the transceiver housing bottom portion 210a such that the ROSA 230 is spaced from the circuit board 240. The illustrated embodiment of the ROSA supports 260 have an L-shaped portion such that the ROSA supports 260 extend from sides of the transceiver housing bottom portion 210a and support the ROSA 230 without interfering with the circuit board 240 or any components thereon.

Figure 4:
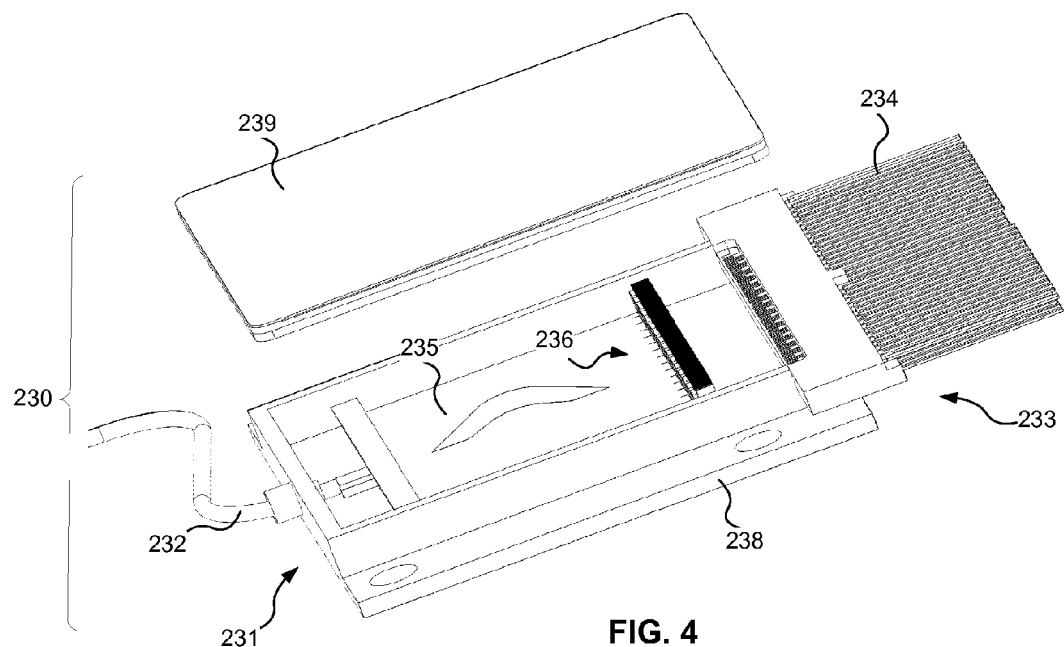
FIG. 4 is an exploded perspective view of a multi-channel ROSA for use in a compact multi-channel optical transceiver, consistent with an embodiment of the present disclosure.
Figure 5:
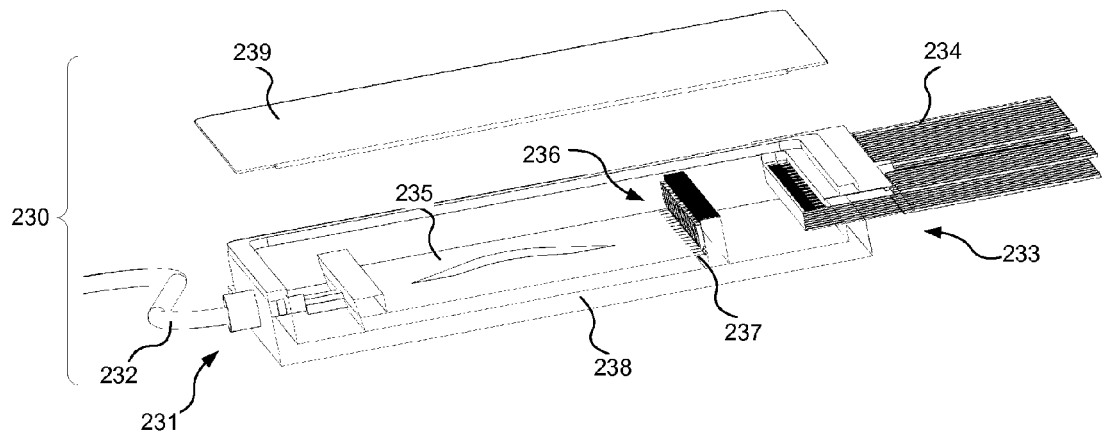
FIG. 5 is a cross-sectional view of the multi-channel ROSA shown in FIG. 4.

Referring to FIGS. 4 and 5, an embodiment of the multi-channel ROSA 230 is described in greater detail. The ROSA 230 includes a demultiplexer 235, such as an AWG, mounted on a ROSA base portion 238. Optical outputs 237 of the demultiplexer 235 are optically coupled to an array of photodetectors 236, such as photodiodes. An input of the demultiplexer 235 is optically coupled to the input optical fiber 232 at the optical connection end 231 and the output of the photodetectors 236 are electrically connected to the ROSA pins 234 at the electrical connection end 233. A ROSA cover 239 covers the ROSA base portion 238 and encloses the demultiplexer 235 and array of photodetectors 236.

Figure 6:
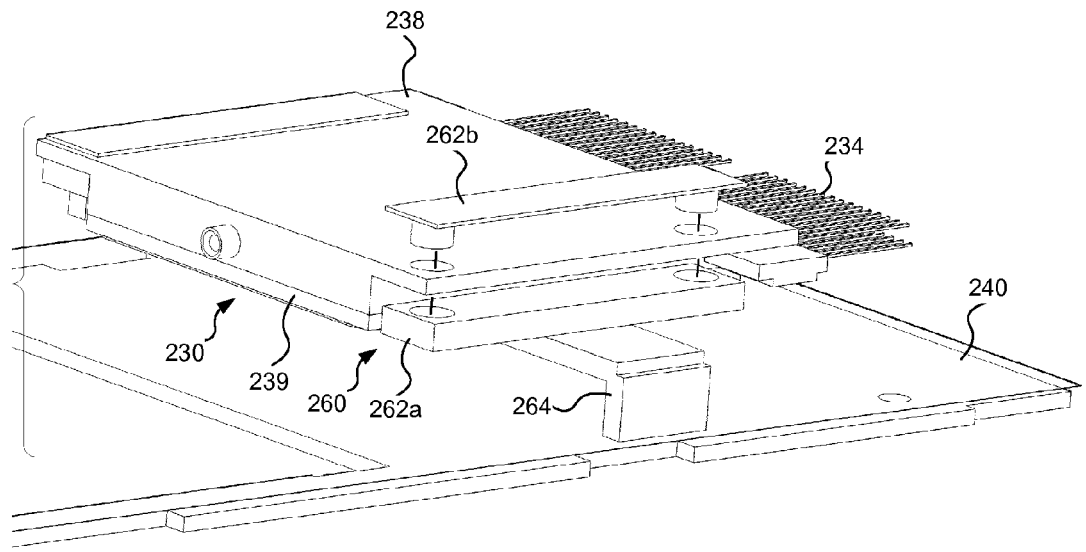
FIG. 6 is an exploded perspective view of a multi-channel ROSA and a ROSA support configured to support the ROSA spaced from a circuit board, consistent with an embodiment of the present disclosure.
Figure 7:
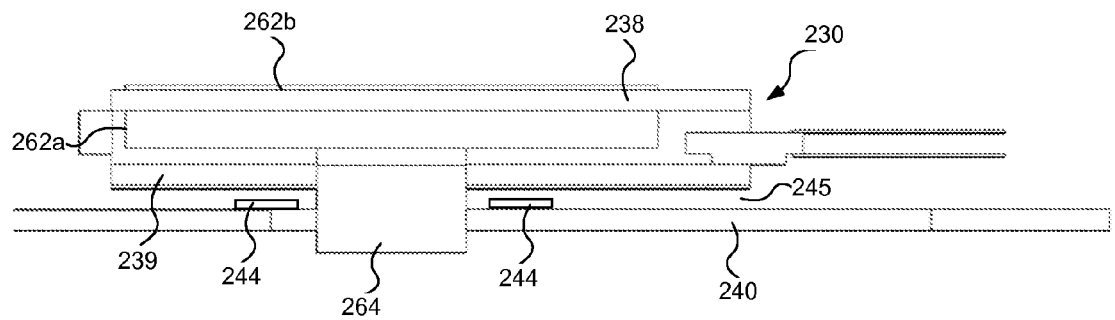
FIG. 7 is a side view of the multi-channel ROSA in FIG. 6 spaced from the circuit board.
Figure 8:
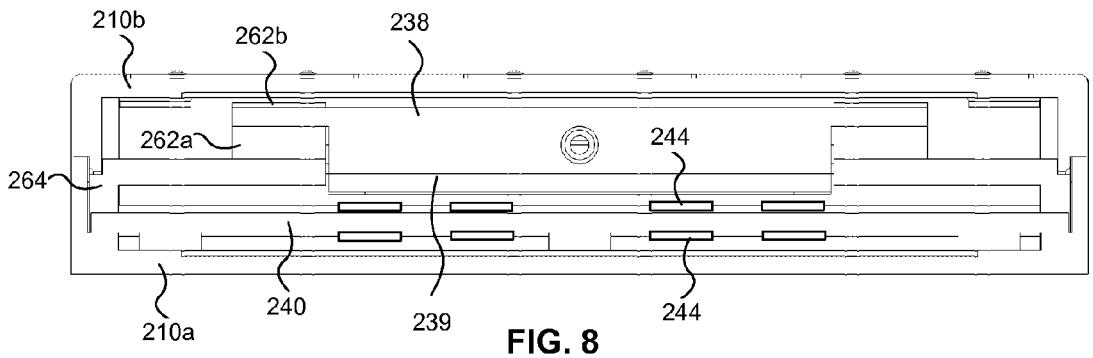
FIG. 8 is end view of the multi-channel ROSA in FIG. 6 spaced from the circuit board and enclosed in a transceiver housing.

When the ROSA 230 is mounted relative to the circuit board 240, as shown in FIGS. 6-8, the ROSA 230 is inverted such that the ROSA base portion 238 faces away from the circuit board 240 and the ROSA supports 260 engage each side of the ROSA base portion 238. The ROSA supports 260 include, for example, clamping bars 262a, 262b engaging the ROSA base portion 238 at each side (see FIG. 6). An L-shaped portion 264 extends from one clamping bar 262a and may be mounted to the transceiver housing bottom portion 210a (see FIG. 8). The L-shaped portion 264 supports the ROSA 230 and spaces the ROSA 230 from the circuit board 240 with a space 245 sufficient to receive circuit components, such as IC components 244. In one example, the space 245 may be in a range of about 1.4 mm to 1.6 mm.

Because the demultiplexer 235 and photodetectors 236 (see FIGS. 4 and 5) are mounted on or proximate the base portion 238, the heat generated by the ROSA 230 tends to be concentrated at the ROSA base portion 238. By inverting the ROSA 230, the ROSA base portion 238 is proximate and facing the transceiver housing top portion 210b (see FIG. 8) such that heat generated by the ROSA 230 is transferred to the transceiver housing top portion 210b and dissipated. The ROSA base portion 238 may be spaced from or thermally coupled to the housing top portion 210b (e.g., contacting the transceiver housing top portion 210b to conduct heat).

Accordingly, the multi-channel optical transceiver module, consistent with embodiments described herein, allows a TOSA, a ROSA, and a circuit board to be accommodated in a relatively small space with adequate heat dissipation and thermal management.

Consistent with an embodiment, a multi-channel optical transceiver module includes a transceiver housing having a transceiver optical connection end and a transceiver electrical connection end. The transceiver optical connection end of the transceiver housing is configured to provide an optical connection and the transceiver electrical connection end of the transceiver housing is configured to provide an electrical connection. The optical transceiver module also includes a multi-channel transmitter optical subassembly (TOSA) located in the transceiver housing proximate the optical connection end. The TOSA is configured to transmit a wavelength division multiplexed (WDM) optical signal on multiple channel wavelengths. The optical transceiver module further includes a multi-channel receiver optical subassembly (ROSA) located in the transceiver housing proximate the electrical connection end. The ROSA is configured to receive a wavelength division multiplexed (WDM) optical signal on multiple channel wavelengths. The optical transceiver module also includes a circuit board located in the transceiver housing and electrically connected to the TOSA and to the ROSA. The ROSA is spaced from the circuit board. The circuit board includes RF inputs located proximate the transceiver electrical connection end of the transceiver housing, and at least a first plurality of integrated circuit (IC) components are located between the circuit board and the ROSA and electrically connected to the TOSA and the ROSA.

Consistent with another embodiment, a multi-channel optical transceiver module includes a transceiver housing including a transceiver housing bottom portion and a transceiver housing top portion. The transceiver housing having a transceiver optical connection end and a transceiver electrical connection end. The transceiver optical connection end of the transceiver housing is configured to provide an optical connection and the transceiver electrical connection end of the transceiver housing is configured to provide an electrical connection. The optical transceiver module also includes a circuit board located in the transceiver housing proximate the transceiver housing bottom portion. The circuit board includes RF inputs located proximate the transceiver electrical connection end of the transceiver housing. The optical transceiver module further includes a multi-channel transmitter optical subassembly (TOSA) located in the transceiver housing proximate the optical connection end and electrically connected to the circuit board. The TOSA is configured to transmit a wavelength division multiplexed (WDM) optical signal on multiple channel wavelengths. The optical transceiver module also includes a multi-channel receiver optical subassembly (ROSA) located in the transceiver housing proximate the electrical connection end and electrically connected to the circuit board. The ROSA is configured to receive a wavelength division multiplexed (WDM) optical signal on multiple channel wavelengths. The ROSA is located between the circuit board and the transceiver housing top portion, is spaced from the circuit board and is inverted to transfer heat from the ROSA to the transceiver housing top portion.

Consistent with a further embodiment, an optical line terminal includes at least first and second multi-channel transceivers. Each of the multi-channel transceivers includes a transceiver housing having a transceiver optical connection end and a transceiver electrical connection end. The transceiver optical connection end of the transceiver housing is configured to provide an optical connection and the transceiver electrical connection end of the transceiver housing is configured to provide an electrical connection. Each of the multi-channel transceivers also includes a multi-channel transmitter optical subassembly (TOSA) located in the transceiver housing proximate the optical connection end. The TOSA is configured to transmit a wavelength division multiplexed (WDM) optical signal on multiple channel wavelengths. Each of the multi-channel transceivers further includes a multi-channel receiver optical subassembly (ROSA) located in the transceiver housing proximate the electrical connection end. The ROSA is configured to receive a wavelength division multiplexed (WDM) optical signal on multiple channel wavelengths. Each of the multi-channel transceivers also includes a circuit board located in the transceiver housing and electrically connected to the TOSA and to the ROSA. The ROSA is spaced from the circuit board. The circuit board includes RF inputs located proximate the transceiver electrical connection end of the transceiver housing, and at least a first plurality of integrated circuit (IC) components are located between the circuit board and the ROSA and electrically connected to the TOSA and the ROSA.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multi-channel optical transceiver module comprising:
a transceiver housing having a transceiver optical connection end and a transceiver electrical connection end, the transceiver optical connection end of the transceiver housing being configured to provide an optical connection and the transceiver electrical connection end of the transceiver housing being configured to provide an electrical connection;
a multi-channel transmitter optical subassembly (TOSA) located in the transceiver housing proximate the optical connection end, the TOSA being configured to transmit a wavelength division multiplexed (WDM) optical signal on multiple channel wavelengths;
a multi-channel receiver optical subassembly (ROSA) located in the transceiver housing proximate the electrical connection end, the ROSA being configured to receive a wavelength division multiplexed (WDM) optical signal on multiple channel wavelengths; and
a circuit board located in the transceiver housing and electrically connected to the TOSA and to the ROSA, wherein the ROSA is spaced from the circuit board, and wherein the circuit board includes RF inputs located proximate the transceiver electrical connection end of the transceiver housing and at least a first plurality of integrated circuit (IC) components located between the circuit board and the ROSA, the IC components being electrically connected to the TOSA and the ROSA.

2. The multi-channel optical transceiver module of claim 1 wherein the circuit board further comprises a second plurality of IC components located on an opposite side of the circuit board.

3. The multi-channel optical transceiver module of claim 1 wherein the first plurality of IC components are arranged in at least two rows.

4. The multi-channel optical transceiver module of claim 1 wherein each of the IC components is associated with a channel of the multi-channel TOSA and ROSA.

5. The multi-channel optical transceiver module of claim 1 wherein the IC components include combination IC components including a laser diode driver and a photodiode limiting amplifier.

6. The multi-channel optical transceiver module of claim 5 wherein the multi-channel TOSA and ROSA are configured to support sixteen (16) channels, and wherein the IC components include sixteen (16) of the combination IC components.

7. The multi-channel optical transceiver module of claim 1 wherein the TOSA has a TOSA optical connection end directed toward the transceiver optical connection end and a TOSA electrical connection end directed toward the transceiver electrical connection end, and wherein the ROSA has a ROSA optical connection end directed toward the transceiver optical connection end and a ROSA electrical connection end directed toward the transceiver electrical connection end.

8. The multi-channel optical transceiver module of claim 7 wherein the TOSA electrical connection end includes conductive pins electrically connected to conductive pads on the circuit board, and wherein the ROSA electrical connection end includes conductive pins electrically connected to conductive pads on the circuit board.

9. The multi-channel optical transceiver module of claim 1 a dual fiber adapter located inside the transceiver housing and at one side of the transceiver housing, the dual fiber adapter having a fiber link end located in the transceiver housing and a pluggable connector end facing outside of the transceiver housing, the fiber link end of the dual fiber adapter being coupled to the TOSA with a first optical fiber and coupled to the ROSA with a second optical fiber to provide an optical connection between the dual fiber adapter and the TOSA and the ROSA, the pluggable connector end being configured to receive first and second pluggable optical connectors for optically coupling the TOSA and the ROSA to external optical fibers.

10. The multi-channel optical transceiver module of claim 9 wherein the dual fiber adapter is a dual fiber LC adapter including an LC connector end configured to receive first and second LC connectors.

11. The multi-channel optical transceiver module of claim 1 wherein a length of the transceiver housing is less than 130 mm, and a width of the transceiver housing is less than 55 mm.

12. The multi-channel optical transceiver module of claim 1 wherein the ROSA includes a ROSA base portion, a demultiplexer mounted on the ROSA base portion, and an array of photodetectors coupled to outputs of the demultiplexer, and wherein the ROSA is oriented in the transceiver housing with the ROSA base portion facing away from the circuit board and facing a top portion of the transceiver housing.

13. The multi-channel optical transceiver module of claim 1 further comprising ROSA supports mounted to a transceiver housing bottom portion and supporting the ROSA spaced from the circuit board.

14. The multi-channel optical transceiver module of claim 13 wherein the ROSA supports include L-shaped portions.

15. A multi-channel optical transceiver module comprising:
- a transceiver housing including a transceiver housing bottom portion and a transceiver housing top portion, the transceiver housing having a transceiver optical connection end and a transceiver electrical connection end, the transceiver optical connection end of the transceiver housing being configured to provide an optical connection and the transceiver electrical connection end of the transceiver housing being configured to provide an electrical connection;
- a circuit board located in the transceiver housing proximate the transceiver housing bottom portion, wherein the circuit board includes RF inputs located proximate the transceiver electrical connection end of the transceiver housing;
- a multi-channel transmitter optical subassembly (TOSA) located in the transceiver housing proximate the optical connection end and electrically connected to the circuit board, the TOSA being configured to transmit a wavelength division multiplexed (WDM) optical signal on multiple channel wavelengths; and
- a multi-channel receiver optical subassembly (ROSA) located in the transceiver housing proximate the electrical connection end and electrically connected to the circuit board, the ROSA being configured to receive a wavelength division multiplexed (WDM) optical signal on multiple channel wavelengths, wherein the ROSA is located between the circuit board and the transceiver housing top portion, and wherein the ROSA is spaced from the circuit board and inverted to transfer heat from the ROSA to the transceiver housing top portion.

16. The multi-channel optical transceiver module of claim 15 further comprising ROSA supports mounted to the transceiver housing bottom portion and supporting the ROSA spaced from the circuit board.

17. The multi-channel optical transceiver module of claim 16 wherein the ROSA supports include L-shaped portions.

18. The multi-channel optical transceiver module of claim 15 wherein the ROSA includes an arrayed waveguide grating (AWG) and an array of photodiodes mounted on a ROSA base portion, and wherein the ROSA is oriented in the transceiver housing with the ROSA base portion facing the transceiver housing top portion to provide thermal dissipation from the ROSA to the transceiver housing top portion.

19. The multi-channel optical transceiver module of claim 15 further comprising a plurality of integrated circuit (IC) components on the circuit board and located between the circuit board and the ROSA, the IC components being electrically connected to the TOSA and the ROSA.

20. The multi-channel optical transceiver module of claim 15 wherein the TOSA is inverted to transfer heat from the TOSA to the transceiver housing top portion.

21. An optical line terminal comprising:
- at least first and second multi-channel transceivers, each of the multi-channel transceivers comprising:
  - a transceiver housing having a transceiver optical connection end and a transceiver electrical connection end, the transceiver optical connection end of the transceiver housing being configured to provide an optical connection and the transceiver electrical connection end of the transceiver housing being configured to provide an electrical connection;
  - a multi-channel transmitter optical subassembly (TOSA) located in the transceiver housing proximate the optical connection end, the TOSA being configured to transmit a wavelength division multiplexed (WDM) optical signal on multiple channel wavelengths;
  - a multi-channel receiver optical subassembly (ROSA) located in the transceiver housing proximate the electrical connection end, the ROSA being configured to receive a wavelength division multiplexed (WDM) optical signal on multiple channel wavelengths; and
  - a circuit board located in the transceiver housing and electrically connected to the TOSA and to the ROSA, wherein the ROSA is spaced from the circuit board, and wherein the circuit board includes RF inputs located proximate the transceiver electrical connection end of the transceiver housing and a plurality of integrated circuit (IC) components located between the circuit board and the ROSA, the IC components being electrically connected to the TOSA and the ROSA.

22. The optical line terminal of claim 21 wherein the ROSA includes a ROSA base portion, a demultiplexer mounted in the ROSA base portion, and an array of photodetectors coupled to outputs of the demultiplexer, and wherein the ROSA is oriented in the transceiver housing with the ROSA base portion facing away from the circuit board and facing a top portion of the transceiver housing.

23. The optical line terminal of claim 22 further comprising ROSA supports mounted to a transceiver housing bottom portion and supporting the ROSA spaced from the circuit board.

24. The optical line terminal of claim 23 wherein the ROSA supports include L-shaped portions.

* * * * *